United States Patent Office

2,695,235
Patented Nov. 23, 1954

2,695,235

PROCESS FOR THE TREATMENT OF WHEY

Barend de Goede, The Hague, Netherlands, assignor to Nederlandse Centrale Organisatie voor Toegepast Natuurwetenschappelijk Onderzoek, The Hague, Netherlands, a corporation of the Netherlands No Drawing. Application December 13, 1951, Serial No. 261,607

Claims priority, application Netherlands December 14, 1950

6 Claims. (Cl. 99—57)

Whey is the liquid that remains after complete or practically complete removal of the casein from milk or from skimmed milk—possibly together with the fat, by coagulation. In addition to some casein, whey mainly contains albumin, globulin, salts and lactose. The solids content may vary considerably, but the average content amounts to approximately 6%.

Up to now whey was partly used as cattle-fodder, with the rest being carried off as waste matter, although, especially the proteins present have particular value in human nutrition.

With respect to other applications thereof, the following drawbacks were inherent: (a) deterioration; (b) unpleasant taste; and (c) high salt content.

Moreover, the content of protein in the solids was too small for many applications.

In times of scarcity whey has also been used for human nutrition and the unpleasant taste was, for want of something better, taken into the bargain.

It was known, in order to improve the tenability, to concentrate the whey into a paste having a solids content of approximately 60–65%, or to convert it into a powder, e. g. by spray-drying.

It has repeatedly been proposed to prepare artificial whites of eggs for the preparation of cake and pastry by starting from proteins of various origin, and to convert these proteins by a treatment with alkali into foaming products. So it is e. g. known to treat casein for more than 24 hours with an aqueous solution of calcium hydroxide.

A great drawback of the artificial egg white obtained in this way is, however, that aqueous solutions containing 5–15% of this protein, do not, or nearly do not, coagulate into a solid gel, if said solutions are heated to a temperature of 100° C.

This is a drawback for the preparation of meringue-pastries; in other cases, when the coagulation is absolutely essential, as e. g. for macaroon biscuits, pie-topping, cocoanut-macaroons and such like, the lack of the property to completely coagulate into a solid gel prevents application of such an artificial protein. Moreover the pH of solutions of artificial proteins, prepared in such a way, is, as a rule, higher than the pH of egg albumin; the foaming properties correspond with this high pH, and if the pH is decreased to a value similar to that of egg albumin, the foaming properties also decline considerably. This high pH unfavourably affects the flavour and, particularly in combination with flour, it also affects the colour of the baked products. For this reason products obtained according to this method may, as a rule, only be added in small quantities to bakery products, by which the technical properties of the baked product become even worse.

The application possibilities are strongly limited by all of the above, since for a good artificial egg albumin, the foaming properties as well as and especially the property to coagulate into a gel at a temperature of less than 100° C., are essential, whereas not too high a pH, preferably one of about 7–8.5 which is much lower than that of the most foaming protein-hydrolysates, is also desirable.

The nature of the coagulum, formed on heating of the protein, is of great importance. When heating whites of eggs they coagulate into a gel; in so far as a solution of a substitute for white of egg has any coagulating properties, the coagulum formed on heating is as a rule not a gel, but is composed of non-coherent flakes.

It has been tried to obtain a foaming product from albumin by treatment with alkali, but sometimes these products have an unpleasant flavour and taste, probably caused by sulfur-compounds formed by hydrolysis of the sulfur-containing albumin when heated with alkali.

It has also been proposed to prepare a substitute for egg-albumin from whey by concentrating said whey at a temperature below the coagulation-point of the albumin, and by removing the crystallized lactose after cooling by filtration or by centrifugation. Thereupon the salts are partly removed by means of dialysis. The pH-value is maintained at about 7 during the entire treatment. The product obtained in this way has poor foaming properties on whipping, and moreover on heating it does not coagulate into the form of a gel which is desirable for baking.

It is the main object of the invention to prepare from whey an artificial white of egg, having substantially the foaming properties and coagulating properties of whites of eggs.

Applicant has succeeded in treating whey—irrespective of whether it has been derived from cheese-making or from the preparation of textile casein or from any other origin—in such a way that a product is obtained, fully behaving as egg-albumin with regard to the coagulating and foaming properties, and more especially coagulating on heating into a coherent gel.

According to this invention, the pH of whey, preferably of concentrated whey, having a content of solids of about 50%, is quickly raised to at least 9, and preferably to a value between 9 and 10.5, and is then filtered. It is difficult to filter common whey paste, having a solids content of more than 30% and having a pH of 7 or lower. At a solids content of 45–55%, filtration is practically impossible due to the small speed of filtration. Raising of the pH lowers the viscosity and the properties of the concentrated whey, which has proved to have great influence upon the workability of the paste in a filter press in bulk quantities.

In the Table I following hereafter, the relation of pH, viscosity of the filtrate and speed of filtration is shown of a whey concentrate having a solids content of 57.7% and which has been brought to various pH-values by the addition of resp. 2.4, 6.1, 7.7, 8.2, 10.4 and 16.2 cc. 8 n NaOH to 250 cc. of concentrate.

TABLE I

| pH | Viscosity of the filtrate according to Ostwald at a temperature of 20° C. (for water $t^{20}=20.8$) | Speed of filtration |
|---|---|---|
| 7 | 230 | very slow. |
| 9 | 103 | fair. |
| 10 | 112 | somewhat quicker. |
| 10.5 | 123 | as before. |
| 11 | 213 | very slow. |
| 11.5 | 368 | practically unfilterable. |

It was further proved that the filtrate, containing e. g. 25–35% of albumin, calculated on total solids, on heating forms a good coherent coagulum and converts into a solid gel, having properties corresponding to a gel of a solution of white of egg of similar protein content, especially if the pH was reduced before heating to a value between 6 and 8.

A further advantage of the filtration method according to the invention proved to be that on electrodialysis of the filtrate no encrustation of precipitations on the cathode membrane are formed, this being a normal difficulty when electrodialyzing normal whey or concentrated whey.

This may be explained by the fact that the CaO and $P_2O_5$ content has strongly been decreased in the filtrate, especially so if filtration was carried out at a pH of 10–11.

In Table II the $P_2O_5$ and CaO content has been indicated, calculated for 100 parts of solids of the filtrate, obtained from the filtrations of samples as indicated in Table I.

TABLE II

| pH | $P_2O_5$ | CaO |
|---|---|---|
| 7.0 | 2.5 | 0.78 |
| 9.0 | 1.95 | 0.30 |
| 10.0 | 1.30 | 0.20 |
| 10.5 | 1.41 | 0.13 |
| 11.0 | 1.26 | 0.11 |
| 11.5 | 1.38 | 0.32 |

It was further proved that at a pH-value of more than 10.0 and especially of more than 10.5, the solubility of lactose in the whey-serum strongly increased, so that also for this reason the pH of the solution must preferably not be too high during the filtration. This is especially of importance, because it appeared that the speed of filtration is strongly increased, and sometimes filtration is only possible, if a certain quantity of lactose crystals is present in the liquid, said lactose crystals serving as filteraid. When said lactose crystals are lacking, another filteraid such as e. g. infusorial earth must be added, by which a practically worthless filter-cake is obtained. A filter-cake, consisting of lactose crystals mixed with protein and calcium salts and phosphates is, however, as such useful as fodder. Thereby the quantity as well as the size of the lactose crystals proved to have influence upon the filterability and the speed of filtration; the size of the crystals must substantially be of the order of 10 to 100μ, and the quantity of lactose crystals must preferably be not lower than 10% of the weight of the mass to be filtered.

In some cases the filtration proved to proceed even better if the pH of the whey was first raised to a value of 11 to 12 and thereupon, by means of passing carbonic acid through the whey, was reduced again to a value of not lower than 9.

On this treatment an easily filtered precipitation is developed, which contains much calcium and which can be carried off together with crystallized lactose; after filtration a liquid is obtained which forms a consistent gel by heating.

If it is desired to prepare a product which also has good foaming properties, the starting whey has to be carefully separated to reduce the fat content to a value which is as low as possible. It is probable that the fact that a considerable portion of the remainder of fat present in the whey-paste remains in the precipitate, also has a favourable influence on the foaming properties of the filtrate. Further it was proved that the fat content also has a great influence on the filterability of the precipitate, and that a careful separation of the thin whey for removal of a remainder of fat improves the speed of filtration.

It is preferred to start from whey which is pretreated in such a way that it is as little as possible supersaturated with lactose. For example, the thin whey may at once be concentrated to a concentration at which it is still manageable, e. g. to a solids content of 50%, and subsequently this concentrate may be left for some days at normal or slightly reduced temperature in order to crystallize the lactose. For this purpose the whey may be stored for some days at a temperature of about 0° C. A still more suitable starting product is obtained when the whey is first concentrated to a higher solids content—e. g. 65%—thereupon the lactose is crystallized as much as possible—which can be done in the aforementioned way—and then immediately, before the addition of the lye, the concentrated whey is diluted to the desired final solids content, e. g. 50%. This dilution may take place with water, but also with fresh thin whey.

In both cases the crystallization of lactose may be promoted by the seeding with a quantity of powdered lactose. The invention may, however, also be applied to whey paste which is common in trade. Naturally the process can also be carried out starting from whey powder, which is mixed with water to the desired solids content. Care should only be taken that the proteins are not denaturated by heating during the drying process.

The increase of the pH is preferably effected by an alkali-hydroxide; if desired also ammonia may be used or other substances with alkaline reaction, such basic salts, amines etc. With calcium hydroxide, the calcium carbonate formed at the following carbonating step, does not precipitate in an easily filterable condition. Instead of alkalinizing and carbonating, also soda may be added. The result obtained in this way is, however, inferior to the results obtained by the addition of ammonia, whereas this latter in its turn gives a product of a quality inferior to those obtained with alkali hydroxides.

The further process will accordingly be elucidated in accordance with addition of alkali-hydroxide, and is applicable in analogy to the other alkalinizing substances.

It is of importance to quickly raise the pH to a level of 9–10.5, or if it is to be carbonated, to 11–12, because considerably less lye is required on quick addition. For example the quantity of alkali hydroxide necessary to raise the pH to 11 within one minute amounted to about half the quantity which is required when the addition is spread over 15 minutes.

Probably the greater consumption of lye on slow addition is a consequence of the fact that on slow addition decomposition or disintegrating processes occur, said processes using up lye and also unfavourably affecting the quality as well as the yield of the final product.

All treatments must therefore take place with sufficient speed, and particularly the addition of and mixing with lye, to obtain the desired pH, to preferably be completed within 15 minutes.

The temperature is preferably maintained low, e. g. between 0° C. and room temperature, or even below 0° C.

Preferably filtration or carbonation is carried out immediately after the desired pH value has been reached. For this purpose generally carbonic acid is passed into the mixture, in consequence whereof the pH gradually falls. When a pH level of 9 is reached, the addition of carbonic acid may be stopped, and preferably it is not proceeded further than a pH value of about 8 since the solubility of the calcium rises again when the pH is decreased to less than 8.

Also on carbonating there are advantages in maintaining low temperatures especially in the beginning when the pH is still high. The carbonic acid may be added either at reduced or raised pressure. Instead of carbonic acid, a substance or a mixture giving off carbonic acid may be added, e. g. solid carbonic acid, or a bicarbonate may be added to the liquid.

The precipitate can also be separated from the liquid in other ways, e. g. by centrifugation, settling, etc. A rapid separation by a filter press has advantages, especially in order to prevent the formation of foam. If necessary, the filterability can be further improved by the addition of filteraids, such as infusorial earth, but this reduces the value of the filter-cake. It is also possible to remove the greater part of the precipitate at once, followed by a second filtration with the addition of a filter aid. The separated precipitate, mainly consisting of lactose, can be worked up to lactose, but when no filteraid is used it is especially suitable after drying for use as cattle fodder.

The thus treated whey has a salty taste, which is a drawback for many applications. However, the salt content may be reduced in any known way, e. g. by dialysis or electrodialysis.

A product of excellent quality is obtained if the salt is removed by electrodialysis, at a pH between 6 and 8; the liquid obtained in this way may be applied as such or after concentration. The product thus obtained can be substituted for white of egg in practically all applications. To obtain better tenability it is preferred to concentrate or dry the product, preferably by spray-drying or freeze-drying, but the temperature must be maintained below the coagulating point.

In elucidation some examples of the invention are given hereinafter.

*Example I*

200 kilos of whey concentrate, having a protein content of 7.6%, were diluted with 24 kilos of water. After this dilution the concentrate had a protein content of 6.8%; a lactose content of 46.5% and further contained a. o. 0.45% of CaO and 0.89% of $P_2O_5$. The pH value was 5.8.

By addition of 7 liters 8 n NaOH, mixing quickly at a temperature of 12° C., the pH was raised to 9.8, whereupon the mass was filtered in a filter press with an overpressure of three atm. The filtrate contained 32.8% of solids, 10.1% of protein, 14.6% of lactose, 0.08% of CaO and 0.45% of $P_2O_5$; the pH of the filtrate immediately after filtration amounted to 9.0. By purification lactose may be obtained from the filtercake which mainly consists of lactose, but said filtercake as such is an excellent fodder.

The filtrate coagulates, even in dilution of one part to 3 parts of water, on heating, into a coherent gel, and has good foaming properties.

Example II

The filtrate of Example I was electrodialytically desalted in the way described in the Dutch patent application No. 139,478 (U. S. A. patent application Ser. No. 208,974). The disturbing incrustation of the cathode membrane, as a rule occurring after about 50 hours during this electrodialysis, proved to have become negligible in this case; on electrodialysis the coagulating and foaming properties of the protein-solution remained unaffected.

Example III 2500 kilos of thin whey were concentrated in a vaporising apparatus at a temperature below the coagulating point to a concentrate having a solids content of 65%. These solids contained 72% of lactose, 11% of protein and a sulphate ash-content of about 10%.

The obtained paste (180 kilos) was stored for 3 days at a temperature of 0° C. Thereupon the paste was mixed with 35 litres of water. By means of a sample there was determined what quantity of NaOH was necessary to raise the pH to 11. Thereupon the required quantity was quickly added in one portion and properly mixed, immediately after which treatment carbonic acid followed until the pH had fallen to 8.5. The precipitate present in the liquid was filtered off in a filter press by which a filter-cake was obtained having a content of 15% of water and 77% of lactose (the remainder consisting of proteinsubstance and calcium compounds). The filtrate was once more filtered under addition of infusorial earth. The filtrate obtained in this way had a content of 25.2% of solids, 32.5% of said solids being protein.

The remaining liquid coagulated on heating to a coherent coagulum. On whipping a very firm foam was obtained.

Thereupon the liquid was electrodialytically desalted in a three-chamber apparatus until 50% of the salt had been removed. During the electrodialysis the temperature was 35° C. As rinsing liquids a dilute NaOH-solution was used at the cathode side, whereas a dilute HCl-solution, in which 0.1 n $Na_2SO_4$ had been dissolved, was used at the anode side (compare U. S. A. patent application Ser. No. 208,974). The coagulating and foaming properties of the protein were completely preserved on electrodialysing.

Example IV

The solution obtained according to the preceding example is dried with a spray-drier to a powder composed of: 97% of solids, 3% of water, 58.5% of lactose, 6% of ash and 33% of protein. The temperature must not rise to higher than the coagulation-point. On solution of this product in water, a solution is obtained the behavior of which corresponds with the solution of Example III, provided that it is dried with care and at low temperature.

Example V

A sugar-containing product was obtained by dissolving saccharose in the final product of Example III under careful heating, and by concentrating this solution in vacuo. A product is formed showing some likeness to condensed milk, and being composed of about 25% of water, 45–50% of saccharose+lactose, about 15% of protein and 30% of ash. On dilution with water one obtains a foaming protein solution, coagulating to a firm gel on heating.

Example VI

In order to compare the baking quality, meringues were prepared with whites of eggs (A), with the product according to Example III (B), and with artificial white of egg, said artificial white of egg being prepared from trade casein (C).

A. The whites of 8 eggs (125 g.) were whipped up to a dry foam; to this foam 135 g. of crystal sugar and 540 g. of a sugar solution with a boiling point of 116–120° C., could be added. The resultant meringues were dried in an oven at a temperature of 120° C., and were ready in about 2 hours' time.

B. 40 g. of artificial white of egg according to Example II were with 147 cm.³ of water whipped up to a dry foam; to this foam 225 g. of crystal sugar and 565 g. of a sugar solution with a boiling point of 116–120° C. could be added. In the same way as described under A, the resultant meringues can be dried in an oven at a temperature of about 120° C., and these were also ready in about 2 hours.

C. 10 g. of an artificial white of egg from the trade, obtained by alkaline hydrolysis of casein, were mixed with 140 g. of water and whipped up to a dry foam. To this foam 185 g. of crystal sugar and 650 g. of a sugar solution with a boiling point of 116–120° C. could be added. If it is tried to dry the resultant meringues at a temperature of 120° C., the structure is quite lost. The meringues can only be dried by heating at a temperature of 80° C. for 35 hours.

Example VII

Almond paste for macaroon-biscuits, prepared in the usual way from almonds and sugar, by finely grinding these ingredients, must before use be diluted with a protein-solution, in order to obtain a product suitable to be worked up by means of a spout bag, the white of egg, serving to give the pastry the so-called "consistency." For this purpose whites of eggs are used in the bakery.

The batter rises in the oven and thereupon settles somewhat. The inside of the biscuit is completely filled up and has a pleasant tough, stacky structure.

If the solution according to Example I is used instead of egg-albumin, the biscuit has the same good structure as if white of egg is used.

If, however, instead of white of egg, an artificial white of egg from casein is used, the biscuit rises well in the oven, but thereupon it quite collapses into a flat, pancake-like, wet pastry, the inside of which has no structure at all.

I claim:
1. A process of producing a liquid substance having substantially the foaming and heat coagulating properties of natural egg white from a liquid milk whey comprising the steps of cooling said liquid milk whey to a temperature sufficiently low to cause precipitation of a part of the lactose from said liquid milk whey; alkalinizing the thus cooled liquid milk whey to a pH value between 11–12; acidifying the thus alkalinized liquid milk whey to a pH value between 9–10.5 so as to promote the separability of solids present in the liquid milk whey; and separating said solids and said precipitated lactose from said liquid milk whey, the thus remaining protein solution having the foaming and heat coagulating properties of natural egg white.

2. A process according to claim 1 in which said liquid milk whey is concentrated to a sufficient extent to cause precipitation of at least 10% lactose upon cooling of said concentrated liquid milk whey.

3. A process according to claim 1 in which said precipitated lactose has a particle size between 10–100µ.

4. A process of producing a liquid substance having substantially the foaming and heat coagulating properties of natural egg white from liquid milk whey comprising the steps of cooling said liquid milk whey to a temperature sufficiently low to cause precipitation of a part of the lactose from said liquid milk whey; alkalinizing the thus cooled liquid milk whey to a pH value between 11–12; carbonating the thus alkalinized liquid milk whey so as to acidify the same to a pH value between 9–10.5 so as to promote the separability of solids present in the liquid milk whey; and separating said solids and said precipitated lactose from said liquid milk whey, the thus remaining protein solution having the foaming and heat coagulating properties of natural egg white.

5. A process of producing a liquid substance having substantially the foaming and heat coagulating properties of natural egg white from liquid milk whey comprising the steps of cooling said liquid milk whey to a temperature sufficiently low to cause precipitation of a part of the lactose from said liquid milk whey; adjusting the pH of the thus cooled liquid milk whey to a value between 9–10.5 so as to promote the separability of solids present in the liquid milk whey; and separating said solids and said precipitated lactose from said liquid milk whey, the thus remaining protein solution having the foaming and heat coagulating properties of natural egg white; and removing dissolved salts from the thus remaining protein solution.

6. A process of producing a liquid substance having substantially the foaming and heat coagulating properties of natural egg white from liquid milk whey comprising the steps of cooling said liquid milk whey to a temperature sufficiently low to cause precipitation of a part of the lactose from said liquid milk whey; alkalinizing the thus cooled liquid milk whey to a pH value between 11–12; carbonating the thus alkalinized liquid milk whey so as to acidify the same to a pH value of about 9 so as to promote the separability of solids present in the liquid milk whey; and separating said solids and said precipitated lactose from said liquid milk whey, the thus remaining protein solution having the foaming and heat coagulating properties of natural egg white.

References Cited in the file of this patent
UNITED STATES PATENTS

| Number | Name | Date |
|---|---|---|
| 2,128,845 | Myers et al. | Aug. 30, 1938 |
| 2,145,109 | Lisle | Jan. 24, 1939 |
| 2,439,612 | Peebles et al. | Apr. 13, 1948 |